US010775251B2

(12) United States Patent
Jeng (10) Patent No.: US 10,775,251 B2
(45) Date of Patent: Sep. 15, 2020

(54) MONITORING MODULE FOR ASSEMBLY ACCURACY BETWEEN TWO COMPONENTS (71) Applicant: National Chung Cheng University, Min-Hsiung (TW)

(72) Inventor: Yeau-Ren Jeng, Tainan (TW)

(73) Assignee: NATIONAL CHUNG CHENG UNIVERSITY, Min-Hsiung, Chia-Yi County (TW)

( * ) Notice: Subject to any disclaimer, the term of this patent is extended or adjusted under 35 U.S.C. 154(b) by 58 days.

(21) Appl. No.: 16/155,324

(22) Filed: Oct. 9, 2018

(65) Prior Publication Data
US 2019/0339146 A1    Nov. 7, 2019

(30) Foreign Application Priority Data

May 2, 2018 (TW) .............................. 107114936 A (51) Int. Cl.
*G01L 5/161* (2020.01)
*G01B 5/00* (2006.01)

(52) U.S. Cl.
CPC ............ *G01L 5/161* (2013.01); *G01B 5/0007* (2013.01)

(58) Field of Classification Search
CPC ..... G01L 5/161; G01L 1/2225; G01B 5/0007; G01G 21/28; B64F 5/10
USPC .................................................... 73/862.045
See application file for complete search history.

(56) References Cited

U.S. PATENT DOCUMENTS

| 6,243,077 | B1 * | 6/2001 | Manara | G06F 3/0213 345/157 |
| 8,800,385 | B2 * | 8/2014 | Ikebe | G01L 1/04 73/862.041 |
| 9,032,817 | B2 * | 5/2015 | Berme | G01L 5/161 73/862.045 |
| 9,250,146 | B2 * | 2/2016 | Krans | G01L 1/205 |
| 9,459,712 | B2 * | 10/2016 | Ikebe | G06F 3/03547 |

FOREIGN PATENT DOCUMENTS

| CN | 103175638 B | 8/2016 |
| TW | I513927 B | 12/2015 |

* cited by examiner

*Primary Examiner* — Octavia Hollington
(74) *Attorney, Agent, or Firm* — Muncy, Geissler, Olds & Lowe, P.C.

(57) ABSTRACT

A monitoring module for assembly accuracy between two components includes a first component having an installation surface, and a second component having an opposite surface and disposed in a way that the opposite surface faces towards the installation surface. A preload is continuously applied to at least one of the first and second components to press the opposite surface of the second component on the installation surface of the first component. The installation surface is defined with a reference point. At least two load cell pairs are disposed on the installation surface. Each load cell pair has two load cells located on two sides of the reference point respectively, and the imaginary line connecting the two load cells passes through the reference point. Besides, the load cells are separated from each other without any overlap. The opposite surface is pressed on the at least two load cell pairs.

11 Claims, 8 Drawing Sheets

MONITORING MODULE FOR ASSEMBLY ACCURACY BETWEEN TWO COMPONENTS

BACKGROUND OF THE INVENTION

1. Field of the Invention

The present invention relates to assembly technology between two components and more particularly, to a monitoring module for assembly accuracy between two components.

2. Description of the Related Art

China Patent No. CN 103175638B disclosed a structure and a manufacturing method of a transducer, i.e. sensor. In FIG. 11 of the patent, it is disclosed that a force detecting device 90 has a structure wherein four transducers 10 are clipped by two pressurization plates 92, which primarily detects forces in three dimensions X, Y and Z respectively by a first transducer 46 (FIG. 9) whose detection axis is parallel to the direction of Fx, a second transducer 52 whose detection axis is parallel to the direction of Fy, and a third transducer 58 whose detection axis is parallel to the direction of Fz.

The technology of the aforesaid patent is primarily sensing the directions of the forces, but not sensing state variation of two components after the assembly thereof is accomplished.

Taiwan Patent No. 1513927 disclosed a ball screw for real-time monitoring in parallelism, wherein at least two parallelism sensors are disposed between two nuts for monitoring the parallelism between the two nuts in real time. However, the patent only disclosed that the sensors are disposed between the opposite end surfaces of the two nuts for monitoring the parallelism between the two nuts of the ball screw, and the two nuts are hollow in structure, thereby having annular surfaces abutted on each other. In the patent, it wasn't illustrated that if the sensors thereof should be arranged in a paired manner, and each sensor is not defined with any relation between itself and a specific reference point. Therefore, the inventor of the present invention believes that it is necessary to advance further technology and apply for a patent.

SUMMARY OF THE INVENTION

It is a primary objective of the present invention to provide a monitoring module for assembly accuracy between two components, which is effective in monitoring if the assembly accuracy between the two components changes through the arrangement of load cells between the two components.

To attain the above objective, the present invention provides a monitoring module for assembly accuracy between two components, which includes a first component having an installation surface, and a second component having an opposite surface. The second component is disposed in a way that the opposite surface faces towards the installation surface. A preload is continuously applied to at least one of the second component and the first component so that the opposite surface of the second component is pressed on the installation surface of the first component. The installation surface is defined with a reference point. The installation surface is provided thereon with at least two load cell pairs. Each of the at least two load cell pairs has two load cells located on two sides of the reference point respectively, and the imaginary line connecting the two load cells passes through the reference point. Besides, the load cells are separated from each other without any overlap. The opposite surface is pressed on the at least two load cell pairs.

As a result, through the arrangement of the load cells between the two components, the present invention is effective in monitoring if the assembly accuracy between the two components changes.

DETAILED DESCRIPTION OF THE INVENTION

For the detailed description of the technical features of the present invention, preferred embodiments are given herein below and illustrated by the accompanying drawings.

Figure 1:
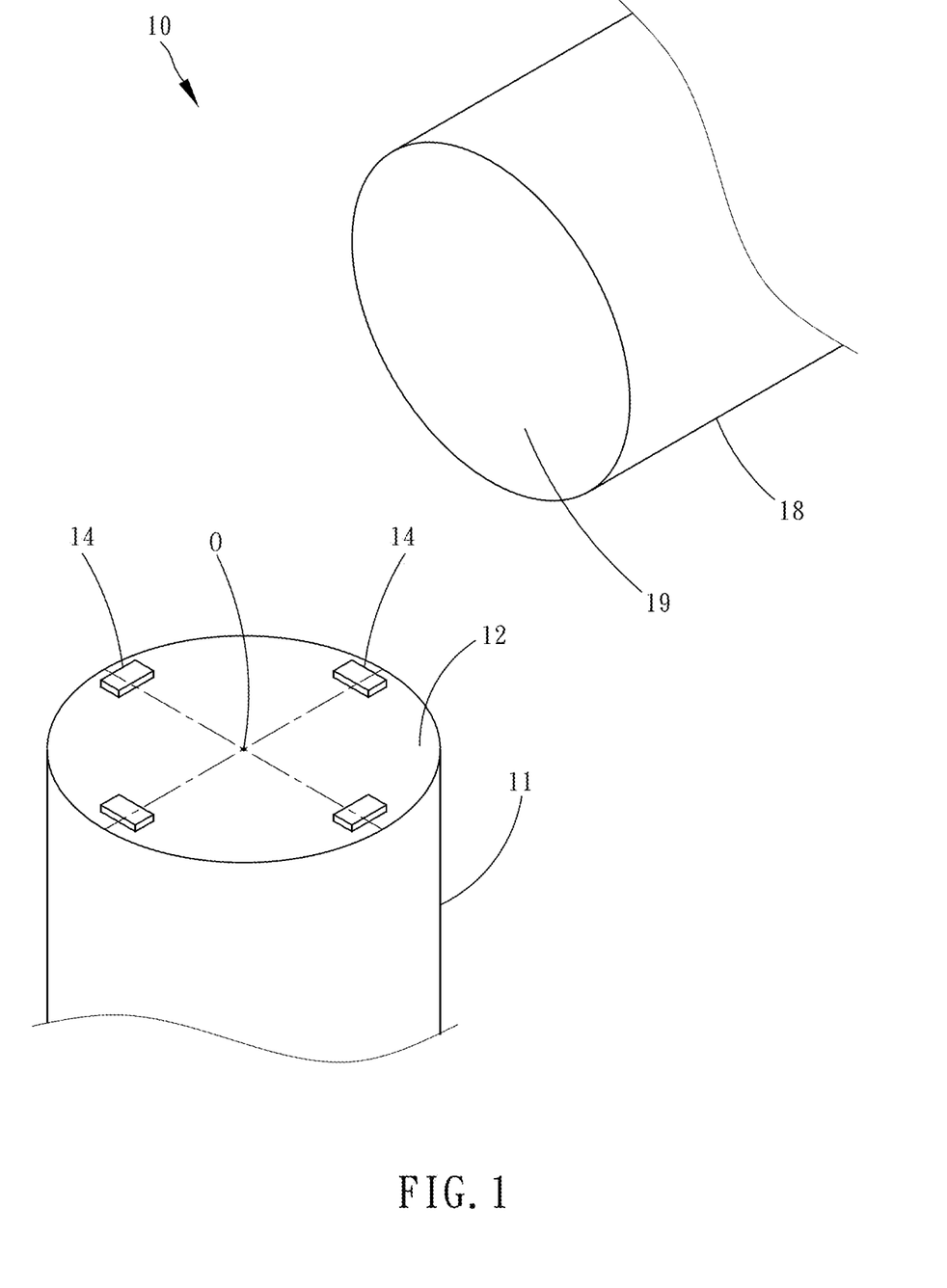
FIG. 1 is an exploded perspective view of a first preferred embodiment of the present invention.
Figure 2:
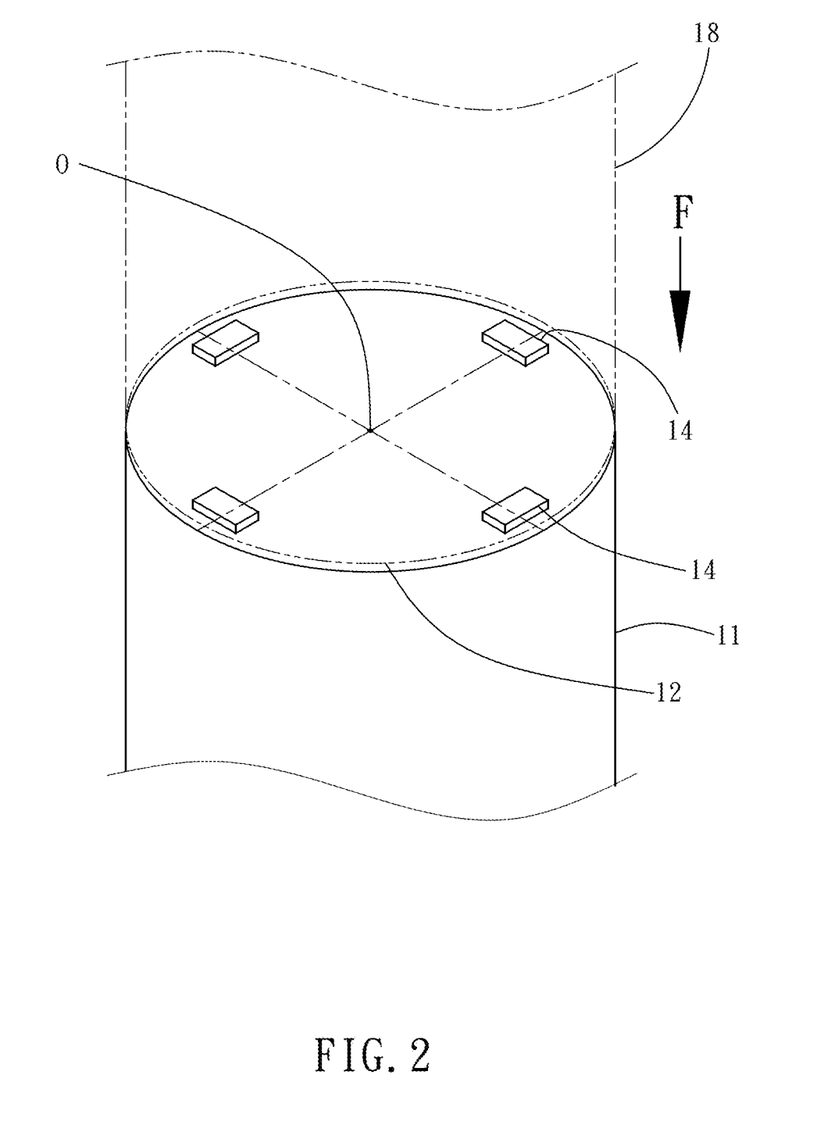
FIG. 2 is an assembled perspective view of the first preferred embodiment of the present invention.

As shown in FIGS. 1-2, the first preferred embodiment of the present invention provides a monitoring module 10 for assembly accuracy between two components, which is primarily composed of a first component 11, a second component 18, and at least two load cell pairs, i.e. at least two pairs of load cells 14.

The first component 11 has an installation surface 12. A reference point O is defined on the installation surface 12, and two load cell pairs, i.e. two pairs of load cells 14, are disposed on the installation surface 12. Each of the two load cell pairs has two load cells 14 located on two sides of the reference point O respectively, and the imaginary line connecting the two load cells 14 has to pass through the reference point O. Besides, the load cells 14 are separated from each other without any overlap. In this embodiment, the strain gauge is instanced as the load cell 14. However, unlimited to the strain gauge, other known force sensors are also applicable to serve as the load cell in the present invention.

The second component 18 has an opposite surface 19. The second component 18 is disposed in a way that the opposite surface 19 faces towards the installation surface 12. A preload F is continuously applied to the second component 18 so that the opposite surface 19 is pressed on the installation surface 12 of the first component 11 and pressed on the two pairs of load cells 14. In other embodied conditions, the aforesaid pressing effect may be resulted from that the preload F is applied to the first component 11; alternatively, the aforesaid pressing effect may be resulted from that the preload F is applied to both the first component 11 and the second component 18.

In this embodiment, for each of the load cell pairs, the two load cells 14 thereof are distanced from the reference point O equally. Besides, for both the load cell pairs, all the load cells 14 thereof are distanced from the reference point O equally so that the arrangement of the load cells 14 forms a circle. Besides, in this embodiment, the installation surface 12 is a flat plane and the first component 11 is solid-shaped on the installation surface 12 without any hollow thereon; the opposite surface 19 is also a flat plane and the second component 18 is solid-shaped on the opposite surface 19 without any hollow thereon.

Through the aforesaid structure, when the preload F is applied to the first component 11 and the second component 18, the assembly is accomplished. As a result, the plurality of load cells 14 are pressed to partake of the preload F, so that every load cell 14 senses a pressure.

The above description illustrates the structure of the first embodiment, the following description will illustrate the usage condition of the first embodiment.

Referring to FIG. 2, in the present invention, the first component 11 and the second component 18 are assembled in a way that a preload F is applied therebetween. Each of the load cells 14 senses a pressure. The user can firstly reset the pressure sensed by each load cell 14 in the normal condition to zero.

When the assembly accuracy between the first component 11 and the second component 18 changes, for example, when the clearance between the two components is reduced or a deflection with respect to the reference point O occurs between the installation surface 12 and the opposite surface 19 to result in a slant, the pressures sensed by all the load cells 14 change or the pressures sensed by a part of the load cells 14 change. In such condition, the user can know about how the assembly accuracy between the first component 11 and the second component 18 changes through the magnitude of the change of the pressure sensed by every load cell 14.

Figure 3:
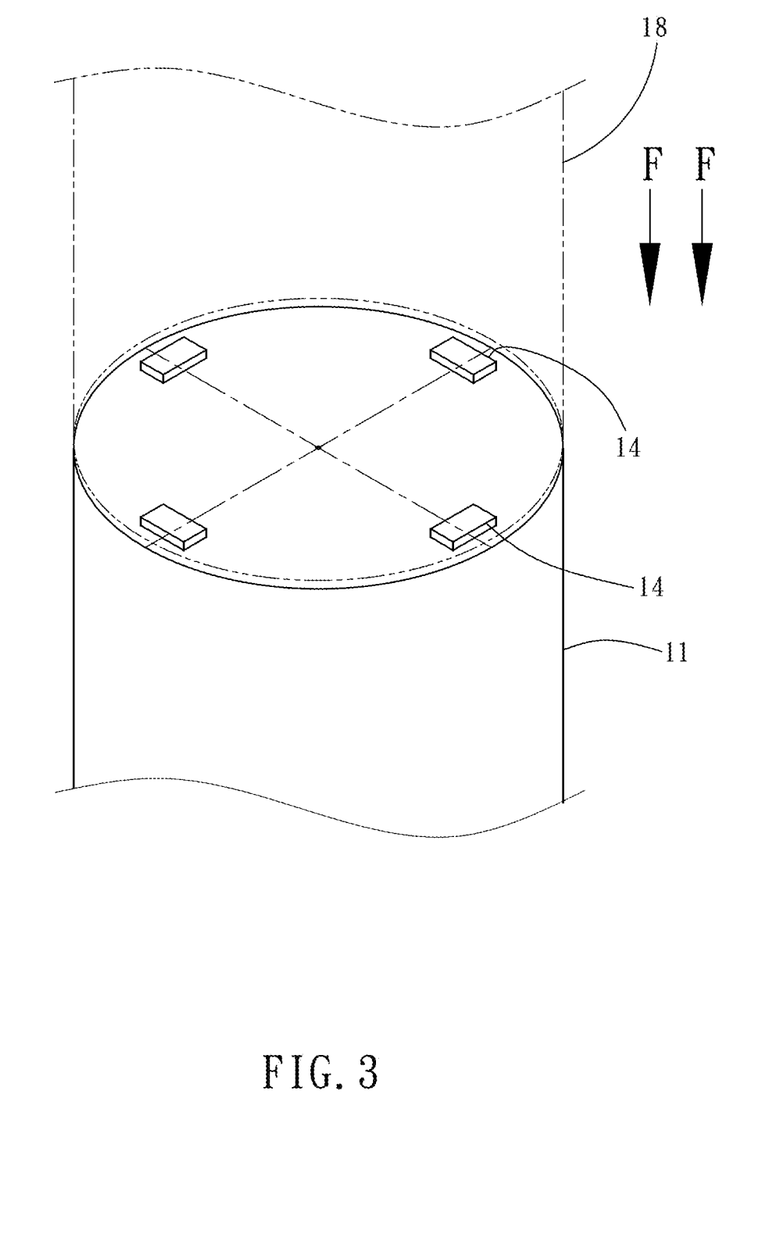
FIG. 3 is a schematic view showing an operation of the first preferred embodiment of the present invention.

As shown in FIG. 3, when the clearance between the first component 11 and the second component 18 is reduced but the direction of the preload doesn't change, the pressures sensed by all the load cells 14 increase at the same time (the preload FF shown in FIG. 3 is the double of the initial preload) and the increased values for all the load cells 14 are equal. Therefore, it can be concluded that the clearance between the first component 11 and the second component 18 is reduced but the direction of the preload doesn't change. Furthermore, the magnitude of the relative displacement between the first component 11 and the second component 18 can be calculated through the deformation which may be caused when the pressure sensed by the load cell 14 changes.

Figure 4:
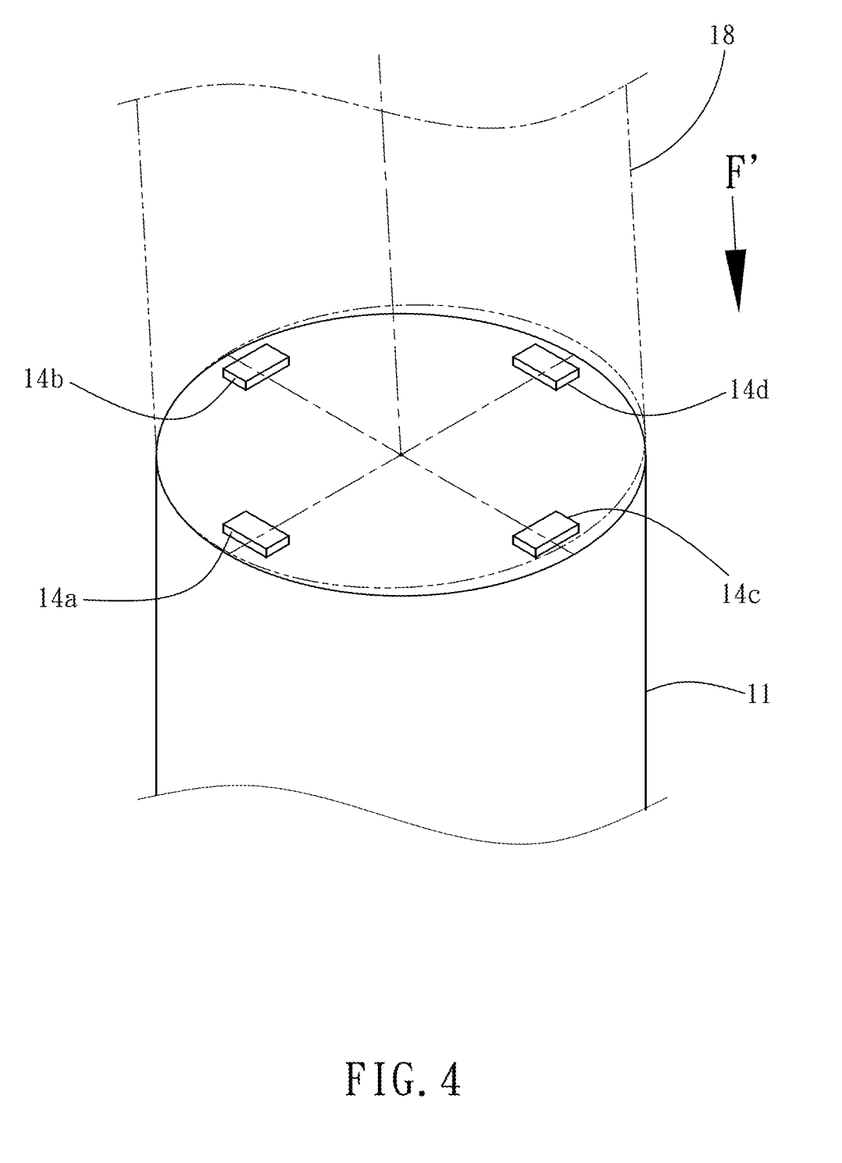
FIG. 4 is a schematic view showing another operation of the first preferred embodiment of the present invention.

As shown in FIG. 4, when a slant occurs between the first component 11 and the second component 18, the load cells 14a and 14b are compressed because of the increase of the preload (the preload F' shown in FIG. 4) and the load cells 14c and 14d is heightened because of the decrease of the preload. Therefore, it can be concluded that the relative position between the first component 11 and the second component 18 changes, and the angle, to which the displacement direction changes, can be determined. Furthermore, the magnitude of the relative displacement between the first component 11 and the second component 18 can be calculated through the deformation which may be caused when the pressures on these load cells 14 change. Therefore, it can be clearly calculated that if the assembly accuracy between the two components changes.

Figure 5:
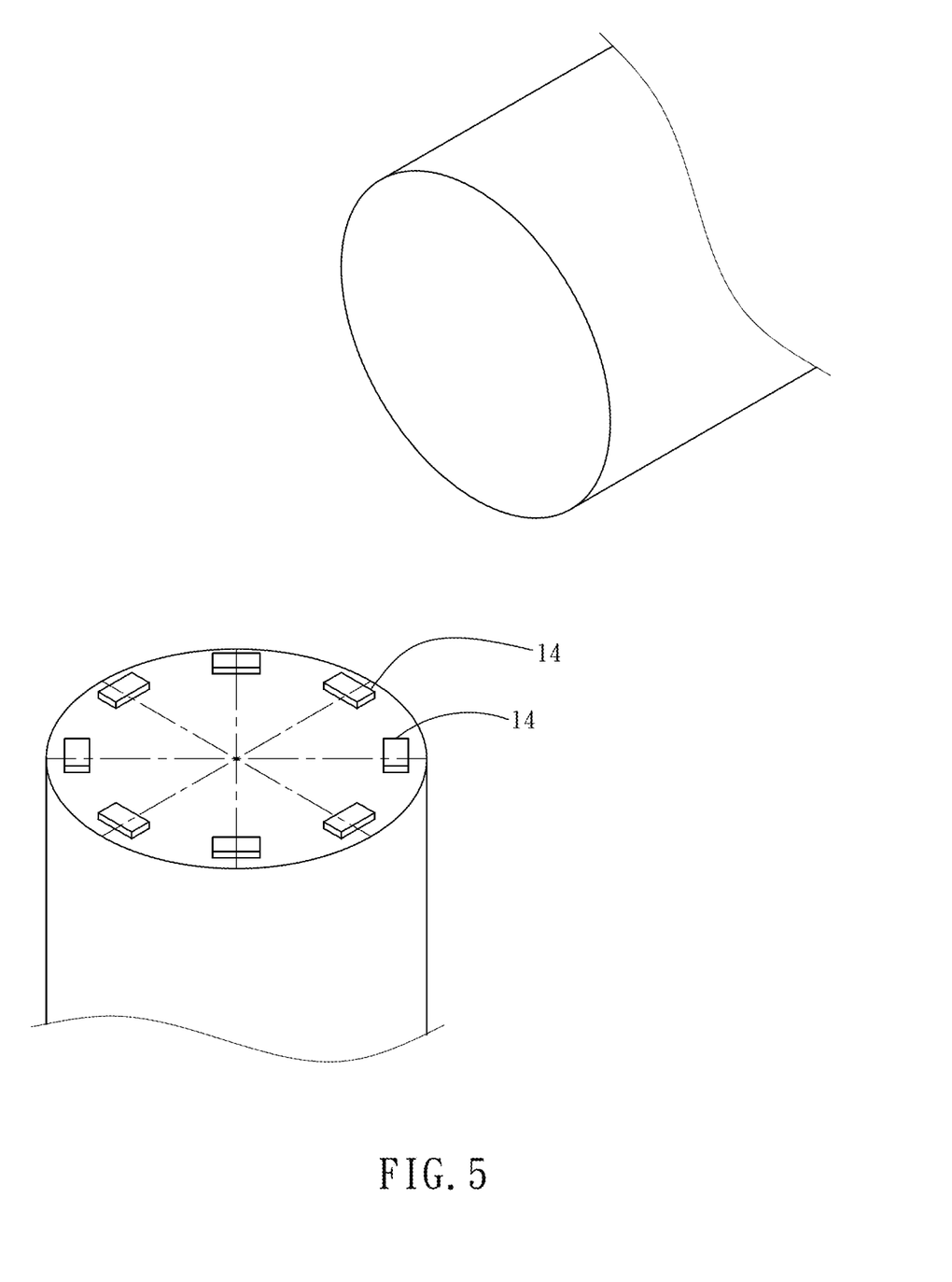
FIG. 5 is an exploded perspective view of another embodied type of the first preferred embodiment of the present invention.

As shown in FIG. 5, it can be understood that the more the paired load cells 14 are provided, the higher the resolution of monitoring the change of the preload is. FIG. 5 shows the condition that four pairs of load cells 14 are provided. In such structure, the load cells 14 correspond to the directions having 45 degrees difference therebetween. When the direction of the preload F changes, the angle of the directional change of the preload can be calculated more accurately.

Figure 6:
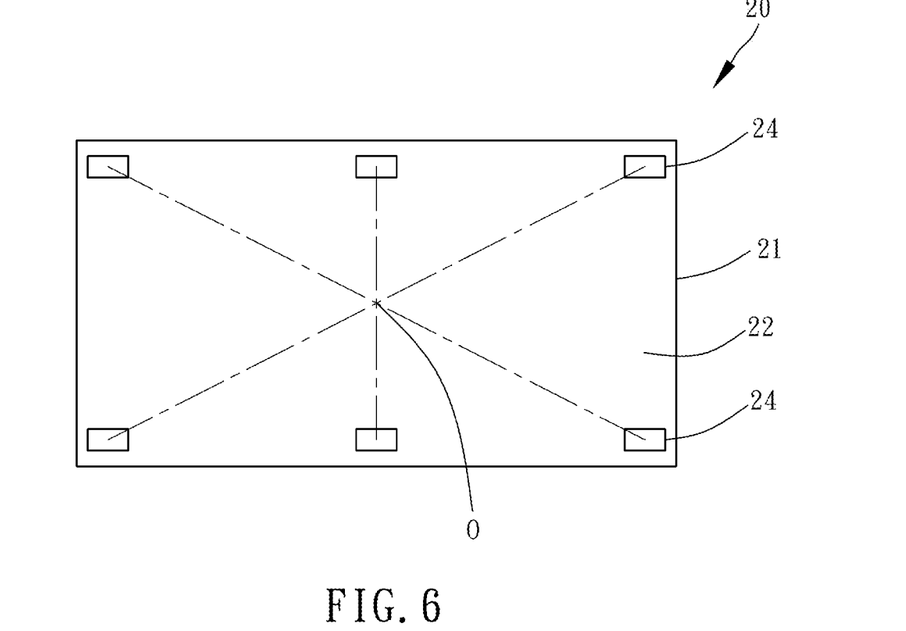
FIG. 6 is a schematic view of a part of the components of a second preferred embodiment of the present invention, showing an installation surface of a first component.

Referring to FIG. 6, the second preferred embodiment of the present invention provides a monitoring module 20 for assembly accuracy between two components, which is primarily similar to the above-disclosed first embodiment, but has the following difference.

For two of the three load cell pairs on the installation surface 22 of the first component 21, the distances between the load cells 24 of one of the load cell pairs and the reference point O are unequal to the distances between the load cells 24 of the other load cell pair and the reference point O.

The second embodiment is adapted for the condition that the installation surface 22 of the first component 21 is not circular-shaped. For example, the installation surface 22 may be rectangular-shaped, as shown in FIG. 6. In such structure, the magnitude of the deformation of each load cell 24 can be also determined through the change of the preload on each load cell 24, so that the magnitude of the change of the assembly accuracy between the two components can be determined.

The other configurations of the second embodiment and the effect attained by the second embodiment are approximately the same with those of the above-disclosed first embodiment, thereby not repeatedly mentioned.

Figure 7:
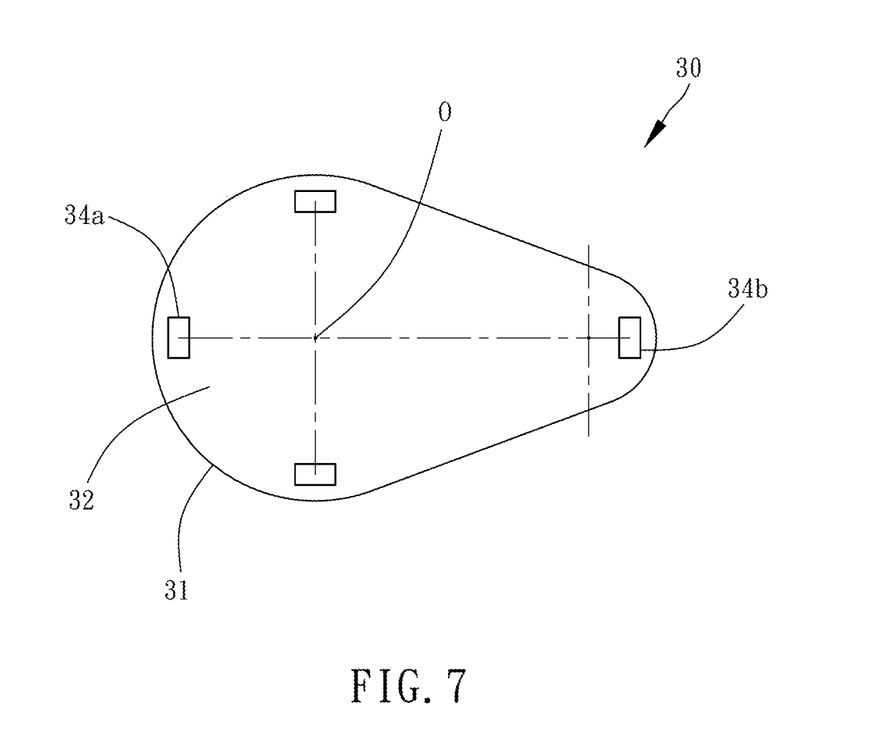
FIG. 7 is a schematic view of a part of the components of a third preferred embodiment of the present invention, showing an installation surface of a first component.

Referring to FIG. 7, the third preferred embodiment of the present invention provides a monitoring module 30 for assembly accuracy between two components, which is primarily similar to the above-disclosed first embodiment, but has the following difference.

For one of the two load cell pairs, a load cell 34a thereof is distanced from the reference point O unequally to the other load cell 34b.

The third embodiment is adapted for the condition that the installation surface 32 of the first component 31 is not circular-shaped. For example, the installation surface 32 may be irregular-shaped, as shown in FIG. 7. When the first component 31 deflects relative to the second component (not shown) with respect to the reference point O in such reflection manner as shown in FIG. 4 for example, the clearance between the installation surface 32 and the opposite surface (not shown) is changed in a way that the deformation of the load cell 34b is the double of the deformation of the load cell 34a, so the decrease of the pressure sensed by the load cell 34b is the double of the increase of the pressure sensed by the load cell 34a. Therefore, in the third embodiment, the magnitude of the deformation of each load cell 34 can be determined through the change of the preload on each load cell 34, so that the magnitude of the change of the assembly accuracy between the two components can be determined.

The other configurations of the third embodiment and the effect attained by the third embodiment are approximately the same with those of the above-disclosed first embodiment, thereby not repeatedly mentioned.

Figure 8:
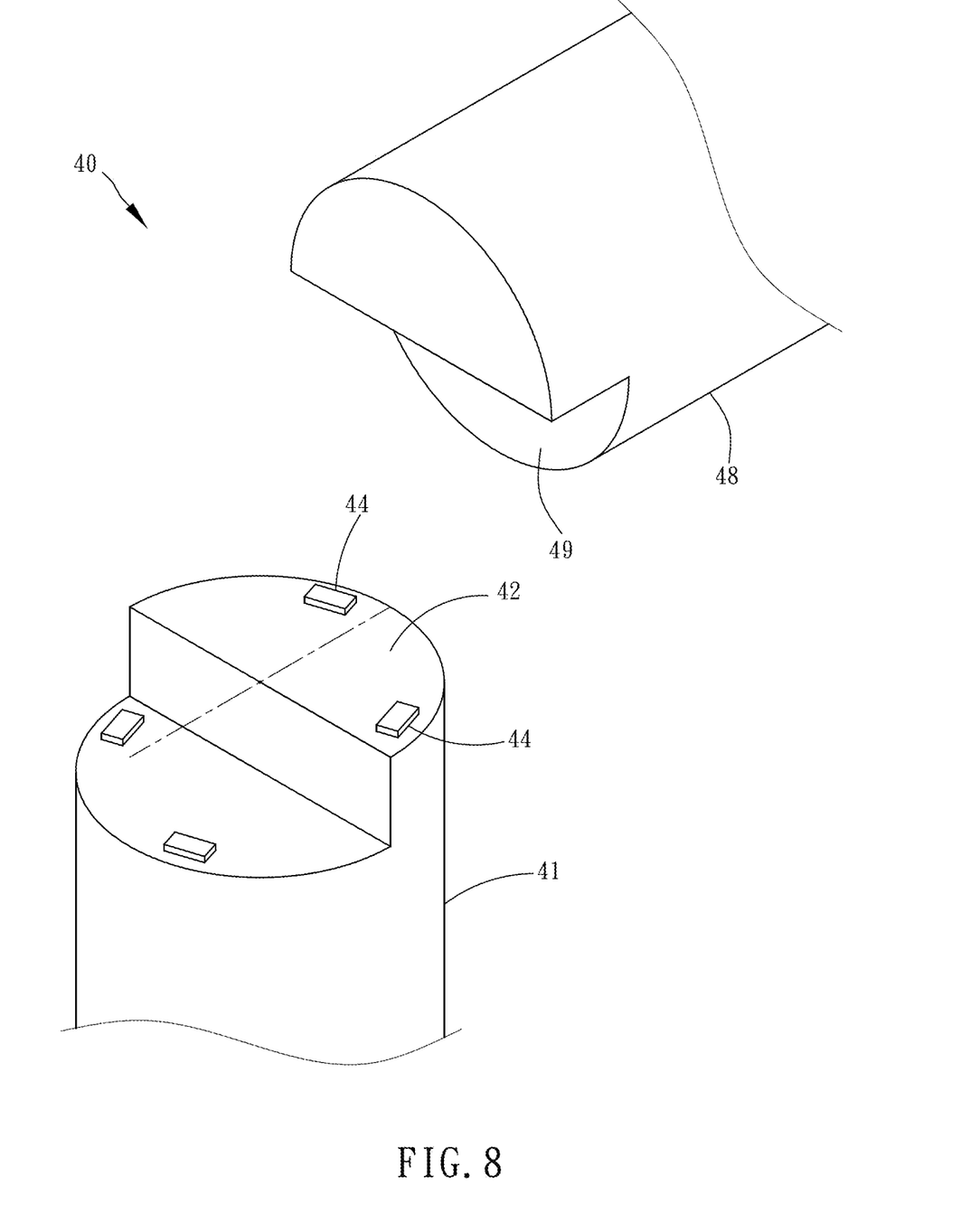
FIG. 8 is an exploded perspective view of a fourth preferred embodiment of the present invention.

Referring to FIG. 8, the fourth preferred embodiment of the present invention provides a monitoring module 40 for assembly accuracy between two components, which is primarily similar to the above-disclosed first embodiment, but has the following difference.

The installation surface 42 is shaped unevenly with a drop in elevation. The opposite surface 49 is shaped correspondingly to the installation surface 42, thereby also shaped unevenly with a drop in elevation, and still kept pressed on the two pairs of load cells 44 on the installation surface 42.

In the fourth embodiment, the installation surface 42 and the opposite surface 49 are not flat, but the magnitude of the deformation between the first component 41 and the second component 48 can be still detected through the deformation of the plurality of load cells 44, so that it can be determined that if the assembly accuracy changes.

The other configurations of the fourth embodiment and the effect attained by the fourth embodiment are approximately the same with those of the above-disclosed first embodiment, thereby not repeatedly mentioned.

Figure 9:
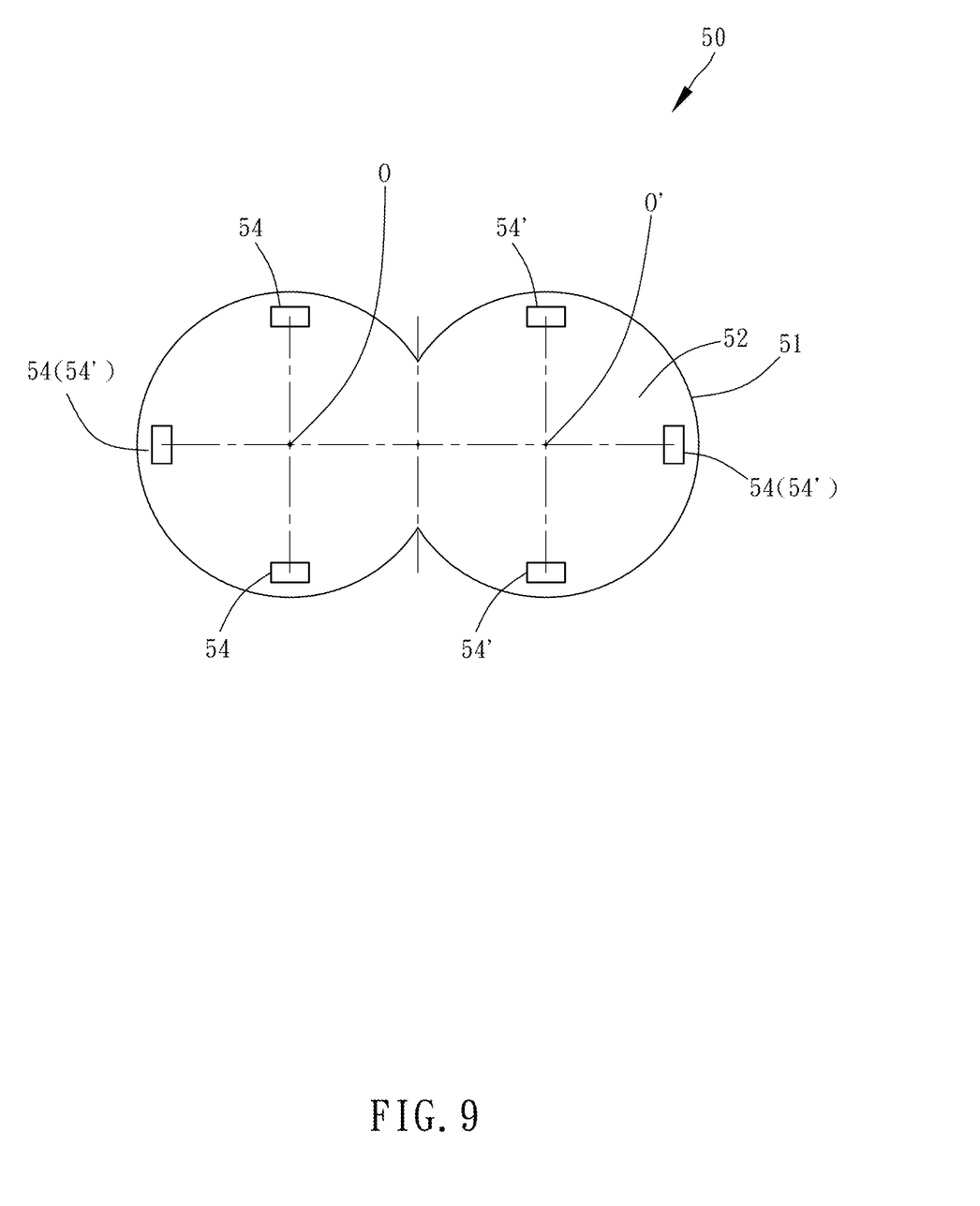
FIG. 9 is a schematic view of a part of the components of a fifth preferred embodiment of the present invention, showing an installation surface of a first component.

Referring to FIG. 9, the fifth preferred embodiment of the present invention provides a monitoring module 50 for assembly accuracy between two components, which is primarily similar to the above-disclosed first embodiment, but has the following difference.

The installation surface 52 is defined with a second reference point O' and further provided with two second load cell pairs, i.e. two pairs of second load cells 54'. The second reference point O' is separated from the first reference point O by a predetermined distance. Each of the two second load cell pairs has two second load cells 54' located on two sides of the second reference point O' respectively, and the imaginary line connecting the two second load cells 54' has to pass through the second reference point O'.

The fifth embodiment, wherein two reference points are provided, is adapted for the condition that the installation surface 52 and the opposite surface (not shown) are irregular-shaped, but the magnitude of the deformation between the first component 51 and the second component (not shown) can be still detected through the deformation of the plurality of load cells 54 and the plurality of second load cells 54', so that it can be determined that if the assembly accuracy changes.

The other configurations of the fifth embodiment and the effect attained by the fifth embodiment are approximately the same with those of the above-disclosed first embodiment, thereby not repeatedly mentioned.

What is claimed is:

1. A monitoring module for assembly accuracy between two components, the monitoring module comprising:
   a first component having an installation surface;
   a second component having an opposite surface, the second component being disposed in a way that the opposite surface faces towards the installation surface, a preload being continuously applied to at least one of the second component and the first component so that the opposite surface of the second component is pressed on the installation surface of the first component;
   the monitoring module being characterized in that:
   the installation surface is defined with a reference point;
   the installation surface is provided thereon with at least two load cell pairs; each of the at least two load cell pairs has two load cells located on two sides of the reference point respectively, and an imaginary line connecting said two load cells passes through the reference point; besides, the load cells are separated from each other without any overlap; the opposite surface is pressed on the at least two load cell pairs;
   wherein the installation surface of the first component comprises a plurality of parts, on which the load cells are respectively provided: the parts of the installation surface of the first component are plane surfaces; and
   wherein the opposite surface of the second component comprises a plurality of parts that are pressed on the load cells; the parts of the opposite surface of the second component are plane surfaces.

2. The monitoring module as claimed in claim 1, wherein for each of the load cell pairs, the two load cells thereof are distanced from the reference point equally.

3. The monitoring module as claimed in claim 1, wherein distances between the load cells of one of the at least two load cell pairs and the reference point and distances between the load cells of another of the at least two load cell pairs and the reference point are all equal.

4. The monitoring module as claimed in claim 1, wherein distances between the load cells of one of the at least two load cell pairs and the reference point are unequal to distances between the load cells of another of the at least two load cell pairs and the reference point.

5. The monitoring module as claimed in claim 1, wherein for one of the aforesaid load cell pairs, the two load cells thereof are distanced from the reference point unequally.

6. The monitoring module as claimed in claim 1, wherein the installation surface is further defined with a second reference point and further provided with at least two second load cell pairs; the second reference point is separated from the reference point by a predetermined distance; each of the at least two second load cell pairs has two second load cells located on two sides of the second reference point respectively, and an imaginary line connecting said two second load cells passes through the second reference point.

7. The monitoring module as claimed in claim 1, wherein the installation surface is a flat plane and the first component is solid-shaped on the installation surface without any hollow thereon; the opposite surface is also a flat plane and the second component is solid-shaped on the opposite surface without any hollow thereon.

8. The monitoring module as claimed in claim 1, wherein the installation surface is shaped unevenly with a drop in elevation; the opposite surface is shaped correspondingly to the installation surface, thereby also shaped unevenly with a drop in elevation, and kept pressed on the at least two load cell pairs on the installation surface.

9. The monitoring module as claimed in claim 1, wherein each of the load cells is a strain gauge.

10. The monitoring module as claimed in claim 1, wherein the load cells are mounted directly on the installation surface.

11. The monitoring module as claimed in claim 1, wherein exactly four load cells are provided on the installation surface.

* * * * *